Patented June 27, 1950

2,513,244

UNITED STATES PATENT OFFICE 2,513,244

PROCESS OF POLYMERIZING BUTADIENE-1,3

Miller W. Swaney, Cranford, and Anthony H. Gleason, Westfield, N. J., assignors to Standard Oil Development Company, a corporation of Delaware No Drawing. Application December 31, 1945, Serial No. 638,589

5 Claims. (Cl. 260—94.2)

This invention pertains to certain oily or soluble thermoplastic polymeric materials and to a method of producing them.

It has been known that rubber-like polymers of butadiene and piperylene or their copolymers with other unsaturated compounds can be thermally treated to form hard, insoluble cyclized resins resembling hard rubber in some respects. The polymers therefore subjected to this thermal conversion or cyclization process have been characterized as non-distillable and in general were solid, rubber-like materials.

Vinyl cyclohexene or 1-vinyl-3-cyclohexene is a cyclic dimer of butadiene and is readily prepared by heating butadiene-1,3 at a temperature of about 130–170° C. or 200° C., preferably at 150° C. for a few hours in the substantial absence of oxygen or in the presence of about 0.01 to about 1.0 wt. per cent of an inhibitor such as hydroquinone, tertiary butyl catechol, benzoquinone, phenyl-beta-naphthylamine and the like. If piperylene is used instead of butadiene, the corresponding methylated vinyl cyclohexene is obtained. The presence of an inhibitor is not essential for satisfactory dimerization. Dimerization is a purely thermal reaction and one which reaches an appreciable rate only above 100° C. At temperatures of 130–170° C. the dimerization reaction speed (about 5–15% per hour) is far greater than mass polymerization to form rubber-like molecules, even in the presence of peroxide catalysts. These cyclic dimers have generally been considered to be unpolymerizable, or at least in contradistinction to styrene and other vinyl compounds they appear to be unable to polymerize by the usual free radical or ionic mechanism to form high molecular weight, linear type macromolecules.

We have now found, however, that the cyclic diolefins obtained by dimerizing butadiene-1,3 or piperylene and having a water-like consistency can be further polymerized to form oils of high viscosity at ordinary temperatures or soluble, thermoplastic resins of low impact strength by mere heating of these cyclic diolefins or dimers. The conversion of the dimers of butadiene-1,3 and piperylene into oily to resinous polymerization products in accordance with the present invention can be readily effected by heating said dimers under their own vapor pressure and in the absence of air for from about 10 hours to several days at temperatures of from about 280 to about 400° C., preferably at temperatures between 290 and 330° C. Polymerization of these dimers at 270° C. is negligible in 48 hours whereas a nearly quantitative yield of soft resin was obtained by heating vinyl cyclohexene for 20 hours at 310–330° C. Extraction of this material gave 20% of oily materials and 80% of resin. The amount of by-products formed which were gaseous at room temperature was below 2%.

Since the dimers of butadiene and piperylene are readily formed from the monomers, the latter may be employed directly as the starting material for the resin preparation in accordance with the present invention. In this case, the only precaution required is that the temperature of the reactor be kept below about 200° C. for a sufficient length of time to allow the concentration of dimer to build up thus avoiding high pressures or pressures in excess of about 1000 lbs./sq. in. After 5–6 hours at 150° C. (about 50–60% dimer formation) the temperature may be raised fairly rapidly to 280–300° C. or higher and maintained in this temperature range until the desired polymerization has taken place.

The products formed in accordance with the present invention, are useful as adhesives, resins, rubber tackifiers and heat bodying agents in varnishes and the like, and in view of their "drying" properties they may be used to advantage in surface coatings. The products of our thermal polymerization may be used as formed or the crude product may be separated into one or more oily fractions and one or more resinous fractions by solvent extraction. This may be accomplished very simply as by dissolving the crude product in a suitable solvent such as benzol and then adding acetone or the like as a non-solvent or precipitant. Other solvents which may be used in place of benzol include toluene, carbon tetrachloride, chloroform and ethyl- or propyl-ethers while any of the lower alcohols such as methyl, ethyl, propyl or butyl alcohols and the like may be substituted for the acetone. The solvent may even be omitted and the soft resinous product extracted by vigorous agitation with boiling isopropyl alcohol or hot acetone. The last traces of solvent and/or precipitant may be readily removed from the resin by blowing with nitrogen or other inert gas at 150–200° C. or by heating under vacuum to about the same temperatures. The softening point of the resin is dependent to a considerable extent upon the completeness with which the oily components are removed. Accordingly the purification or improvement of the crude product may be carried out with such care or repeated a sufficient number of times to give a product of the desired properties.

The following examples are illustrative of the present invention.

Example 1

50 cc. of 1-vinyl-3-cyclohexene were charged into a stainless steel bomb and heated at 280–330° C. for 72 hours. At the end of the reaction period, the product consisted of a highly viscous oil which became solid on cooling to 0° C. The yield was substantially quantitative.

Example 2

600 cc. (380 g.) of liquid butadiene were heated in a one-liter stainless steel bomb for 14 hours at 140–150° C. to effect dimerization (period of heating could have been much shorter if desired). The resulting vinyl cyclohexene was then heated at 280–290° C. (pyod in vapor phase) for 72 hours without agitation. The maximum pressure was about 500 p. s. i. during the dimerization step. This dropped rapidly and during the resinification step the pressure varied between about 200 and 250 p. s. i. A slight residual pressure was frequently found on cooling the bomb and contents to room temperature which was attributed to a small amount of cracked gas. The crude product was a soft resin which was separated into a resin fraction and an oily fraction by dissolving it in benzol and precipitating with acetone. Upon removal of the solvents 110 g. of viscous oil and 250 g. of resin were obtained indicating that the crude product contained about 30% of viscous oil and 70% of the resin by weight.

The resin was found to have these properties:

| | |
|---|---|
| Ash _____ per cent__ | 0.03 |
| Iron _____ do____ | 0.00015 |
| Softening point _____°C__ | 85 |
| Bromine number _____ | 56.6 |
| Avg. mol. wt_____ | 725 |

A 15 gallon varnish (standard terminology in the varnish industry) was prepared by mixing 100 g. of this resin with 120 g. of alkali-refined linseed oil and heating at 305° C. for 4 hours and 20 minutes at which time the cure point was 38 seconds. Cure point is the number of seconds it takes for a drop of the bodied oil to gel when placed on a hot plate at 200° C. (in open air). A cure point of 30 seconds is about as low as is desirable. Original oil had a cure point of about 150 seconds. The varnish was thinned to 50% (by weight) solids with Varsol #2 (a petroleum distillate having a B. P. of 305–395° F. It is mainly paraffinic but contains about 5% of aromatics) and had the following properties:

Color=15 Gardner
Viscosity=N Gardner
Air drying time (0.05% cobalt+0.50% lead)=3 hrs. 40 min.
Baking time (0.05% cobalt+0.50% lead)=4 hrs. @ 120° C.

| | Air Dried Film | Baked Film |
|---|---|---|
| Hardness (Pencil Method)___ | 6_____ | 7 |
| Water Res. (25° C. for 48 hrs.). | unaffected_____ | unaffected. |
| Water Res. (100° C. for 1 hr.)_ | whitening disappeared in 20 minutes. | |
| Alkali resistance (ASTM)___ | Excellent after 4 hrs___ | |

The bodying time of the linseed oil plus resin is slightly faster than the oil alone indicating that the resin is heat reactive and combines with the oil. Non-reactive resins tend to increase the time required for bodying. The resistance of the air-dried films to water and alkali is good. The color of the varnish is good and the hardness of the films about average.

Example 3

A 1-liter stainless steel bomb containing 492 g. of 1-vinyl-3-cyclohexene was heated rapidly to a temperature of 300° C. without agitation and kept at a temperature of 310–320° C. for 20 hours. During that time the internal pressure dropped from 400 p. s. i. to about 100 p. s. i. When cooled to 100° C. the product was poured out and allowed to cool to room temperature at which temperature it was a soft resin. To a solution of the crude product in 500 cc. benzol was slowly added, with stirring, 800 cc. acetone, and the precipitated polymer permitted to settle. Decantation of the top layer and removal of the acetone and benzol therefrom by distillation and blowing at 180° C. with nitrogen gave 97 g. of viscous, oily polymer. The bottom layer was blown with nitrogen at 180–200° C. and gave 363 g. of a hard resin when cool. Losses (6.5%) were largely due to handling and stripping of unreacted dimer.

The foregoing description contains a limited number of embodiments of the present invention. It will be understood, however, that this invention is not limited to the specific conditions since numerous variations are possible without departing from the scope of the following claims.

What we claim and desire to secure by Letters Patent is:

1. The process of preparing resin-containing polymerization products which comprises heating butadiene-1,3 at a temperature between 130 and 200° C. until a major proportion of the butadiene is converted to 1-vinyl-3-cyclohexene, increasing the temperature to between 280 to 400° C. and maintaining the reaction mixture in the absence of oxygen at this temperature until the vinyl cyclohexene is converted to a product containing 70 to 80 weight percent of a solid resin in solution.

2. The process of preparing solid resinous polymerization products which comprises heating butadiene-1,3 at a temperature between 130 and 170° C. until a major proportion of the butadiene is converted to 1-vinyl-3-cyclohexene, increasing the temperature to between 290 to 330° C., maintaining the reaction mixture in the absence of oxygen at this temperature until the vinyl cyclohexene is converted to a resin-containing product, and separating the product into a solid resin fraction and an oily fraction by solvent extraction.

3. The process of preparing solid resinous polymerization products which comprises heating piperylene at a temperature between 130 and 170° C. until a major proportion of the piperylene is converted to the cyclic dimer, increasing the temperature to between 280 to 400° C. and maintaining the reaction mixture in the absence of oxygen at this temperature until the dimer is converted to a viscous oily solution of a solid resinous product and separating said solid resinous product from the solution by solvent extraction.

4. The process of preparing resin-containing polymerization products which comprises heating a diolefin of the group consisting of butadiene-1,3 and piperylene at a temperature between 130° and 200° C. until a major proportion of the diolefin is converted to a cyclic dimer, increasing the temperature to between 280° and 400° C. and maintaining the reaction mixture at this temperature in the absence of oxygen until the dimer is converted to a resin-containing product.

5. The process according to claim 4 wherein the diolefin is piperylene.

MILLER W. SWANEY.
ANTHONY H. GLEASON.

REFERENCES CITED

The following references are of record in the file of this patent:

FOREIGN PATENTS

| Number | Country | Date |
| --- | --- | --- |
| 328,908 | Great Britain | May 1, 1930 |
| 363,348 | Great Britain | Dec. 7, 1931 |